United States Patent [19]
Lee

[11] Patent Number: 6,002,114
[45] Date of Patent: Dec. 14, 1999

[54] CONTROL DEVICE FOR AN ELECTRIC WATER HEATER

[76] Inventor: Ming-Hsiu Lee, No. 585, Tung-Hsing Rd., Sec. 1, Taichung, Taiwan

[21] Appl. No.: 09/153,044

[22] Filed: Sep. 15, 1998

[51] Int. Cl.$^6$ ........................................................ H05B 1/02
[52] U.S. Cl. ............................ 219/501; 219/496; 219/483; 219/506; 392/441; 392/454
[58] Field of Search ...................................... 219/501, 483, 219/486, 497, 496, 506, 494; 392/441, 454, 449; 307/119, 117

[56] References Cited

U.S. PATENT DOCUMENTS

| | | | |
|---|---|---|---|
| 5,504,306 | 4/1996 | Russell et al. | 219/497 |
| 5,784,531 | 7/1998 | Mann et al. | 392/494 |
| 5,866,880 | 2/1999 | Seitz et al. | 219/483 |

*Primary Examiner*—Mark Paschall
*Attorney, Agent, or Firm*—Dougherty & Troxell

[57] ABSTRACT

A control device installed in an electric water heater to control its operation, the control device including a water temperature control circuit and a power control circuit, the water temperature control circuit being formed of a water temperature detection circuit, which detects water temperature at the water inlet and the water outlet of the electric water heater, a water flow rate detection circuit, which detects the flow rate of water passing through the water inlet, a CPU, an indicator circuit controlled by the CPU to indicate the working conditions of the electric water heater, and a digital display controlled by the CPU to show the value of water temperature at the water outlet, the power control circuit being formed of a power supply circuit, a TRAIC triggering control circuit, which turns on the heating elements of the electric water heater alternatively subject AC phase change, a TRAIC power circuit, which provides the TRAIC triggering control circuit with the base power, an AC phase detection input circuit, a relay circuit controlled by the CPU to cut off power supply from the electric water heater when an abnormal condition occurs, a failure detection circuit, which outputs a signal to the CPU when an abnormal condition of the electric water heater is detected, causing the CPU to cut off power supply from the electric water heater, and an overheat protection circuit for overheat protection.

3 Claims, 3 Drawing Sheets

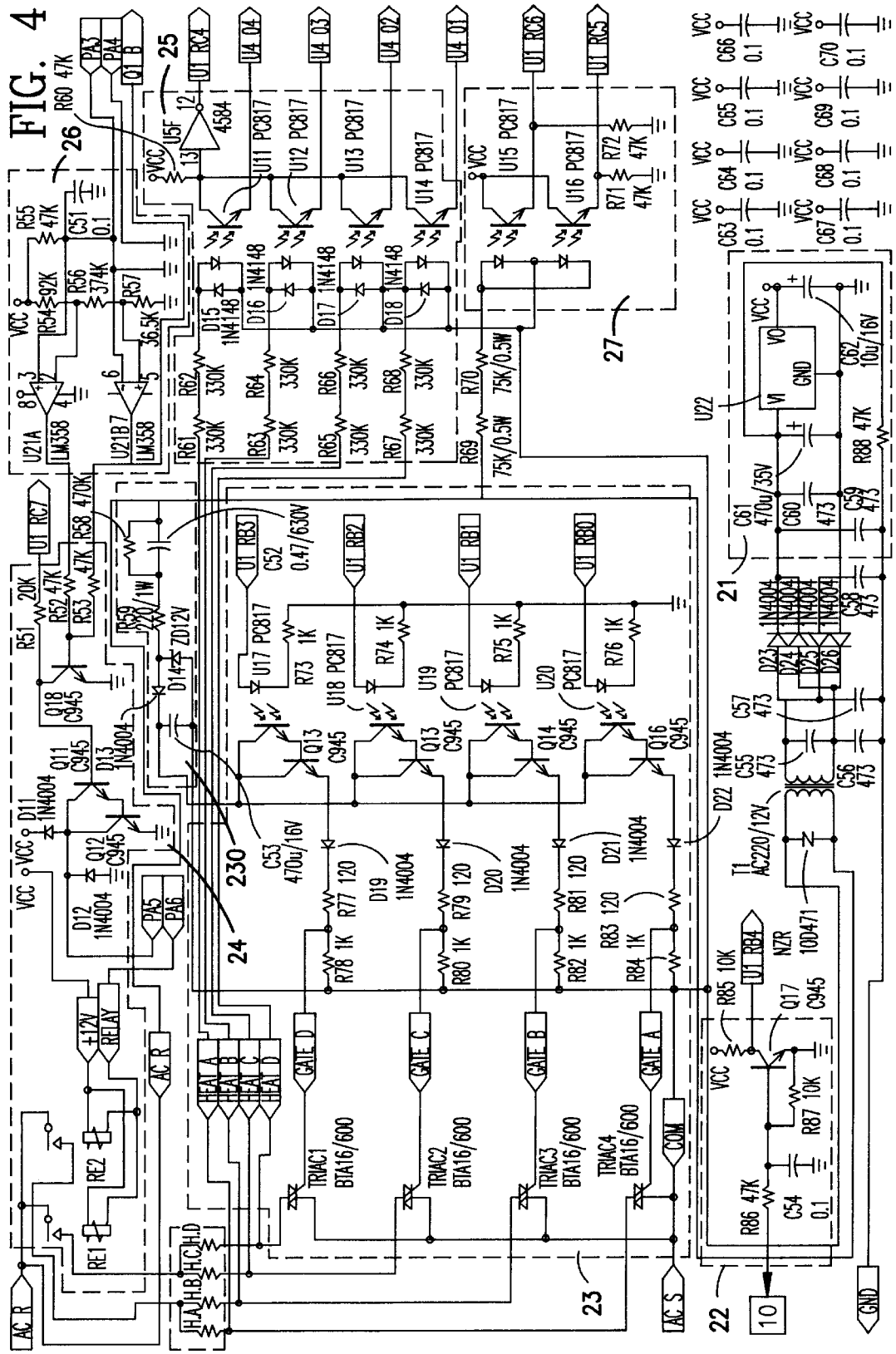

CONTROL DEVICE FOR AN ELECTRIC WATER HEATER

BACKGROUND OF THE INVENTION

The present invention relates to an electric water heater, and more specifically to a control device for an electric water heater which drives heating elements to work alternatively subject to AC phase change, automatically turns off heating elements when no water passes through the water inlet, and has an overheat protection circuit to prevent an overheat.

A regular electric water heater, as shown in FIG. 1, comprises a water tank 30, four heating elements H1,H2, H3,H4 mounted in the water tank 30, and a thermostat 31, which controls the heating elements H1,H2,H3,H4 to heat water to the desired temperature. This structure of electric water heater is still not satisfactory in function. The drawbacks of this structure of electric water heater is outlined hereinafter.

1. When a low water temperature is required, only one heating element H1 is operated to heat water to the desired temperature. When a relatively higher temperature is required, two heating elements H1+H2, three heating elements H1+H2+H3 or four heating elements H1+H2+H3+H4 are turned on to heat water to the desired temperature. Normally, the first two heating elements H1,H2 are most frequently used. Therefore, the service life of the first two heating elements H1,H2 is relatively shorter than the other two heating elements H3,H4. When the first two heating elements H1,H2 are damaged, the last two heating elements H3,H4 may still function well. However the electric water heater becomes unable to function well when the first two heating elements H1,H2 are damaged.
2. The thermostat controls the operation of the heating elements H1,H2,H3,H4 subject to the temperature of water being heated in the water tank 30. However, because the thermostat cannot detect the temperature of water at the water inlet of the water tank 30 and the temperature of water at the water outlet of the water tank 30, accurate temperature control cannot be achieved.
3. This structure of electric water heater has no means to detect the flow rate of intake water, and water may be overheated or the electric water heater may explode when only a low flow rate of water is guided into the water tank 30 and the heating elements H1,H2,H3,H4 are continuously operated.
4. This structure of electric water heater is not safe in use because it cannot automatically cut off power supply when one or a number of the heating elements H1,H2, H3,H4 are damaged.

SUMMARY OF THE INVENTION

The present invention has been accomplished to provide a control device for an electric water heater which eliminates the aforesaid drawbacks. According to one aspect of the present invention, the heating elements of the electric water heater are controlled to work alternatively subject to AC phase change. Because the heating elements are not driven to work at "full load", the average service life of the heating elements is relatively prolonged. According to another aspect of the present invention, water flow rate detection means is provided to automatically detect the flow rate of water passing through the water inlet. When the flow rate of water drops below a predetermined range, the electric water heater is turned off automatically. According to still another aspect of the present invention, temperature detection means is provided to detect the temperature of water at the water inlet and the temperature of water at the water outlet, so that the desired temperature of output water can be controlled accurately. According to still another aspect of the present invention, an overheat detection circuit is provided for overheat protection. According to still another aspect of the present invention, failure detection means is provided to detect the normality of the circuits of the control device, and to cut off power supply from the heating elements upon the detection of the failure of one circuit of the control device.

BRIEF DESCRIPTION OF THE DRAWINGS

FIG. 4 is a detailed circuit diagram of a power control circuit according to the present invention.

DETAILED DESCRIPTION OF THE PREFERRED EMBODIMENT

Figure 1:
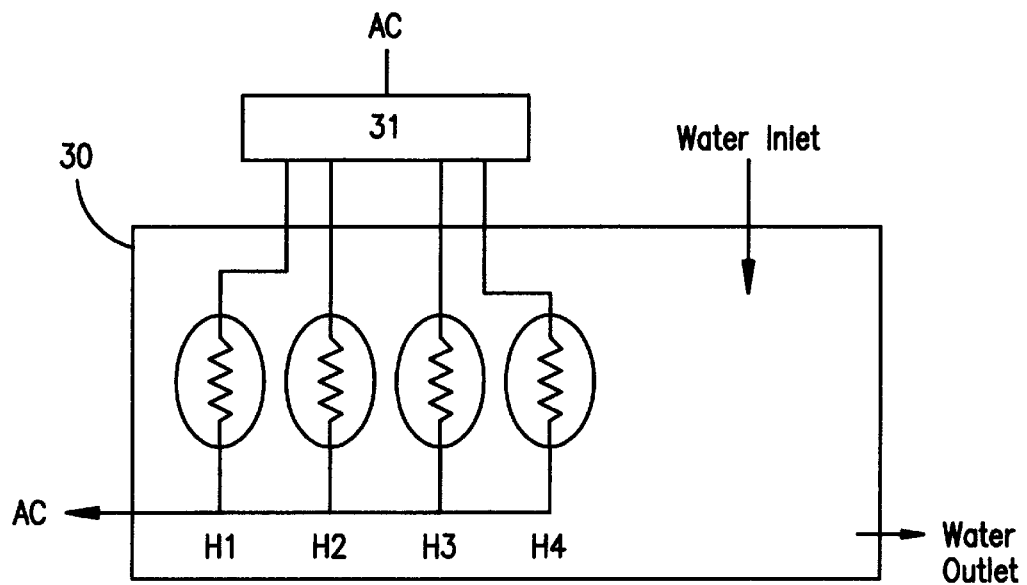
FIG. 1 is a control circuit block diagram for an electric water heater according to the prior art.
Figure 2:
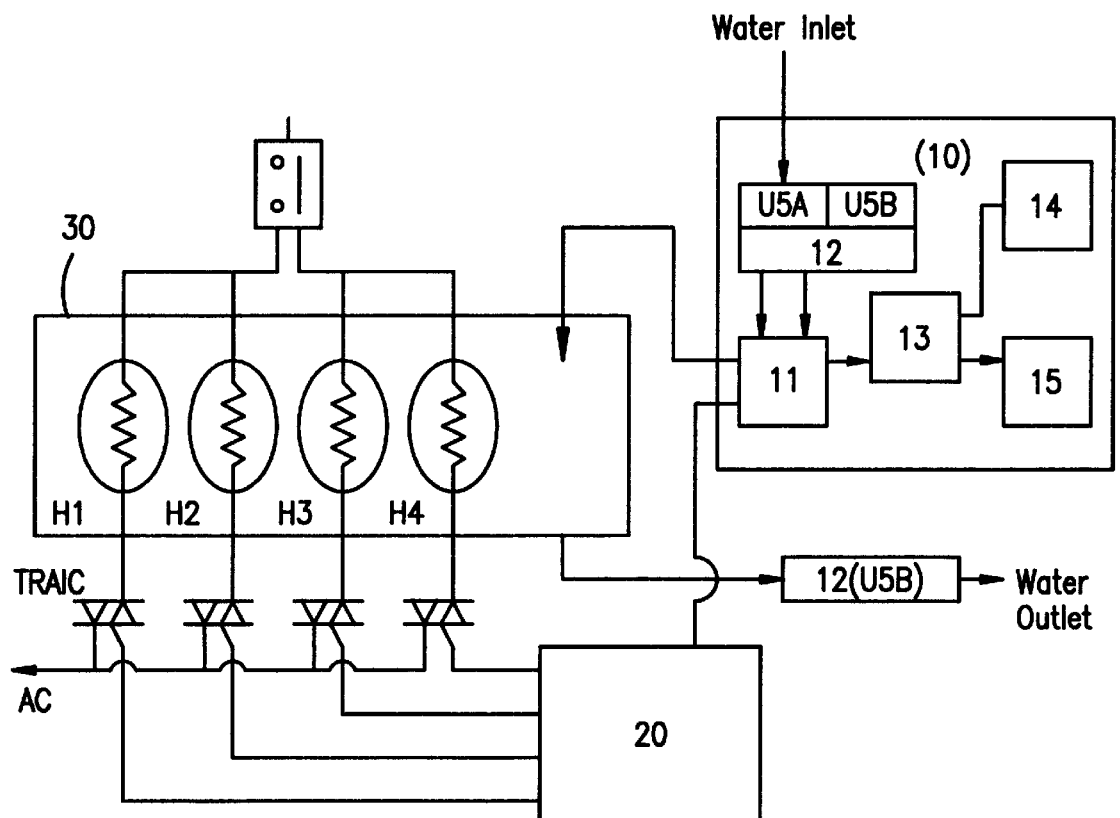
FIG. 2 is a control circuit block diagram for an electric water heater according to the present invention.
Figure 3:
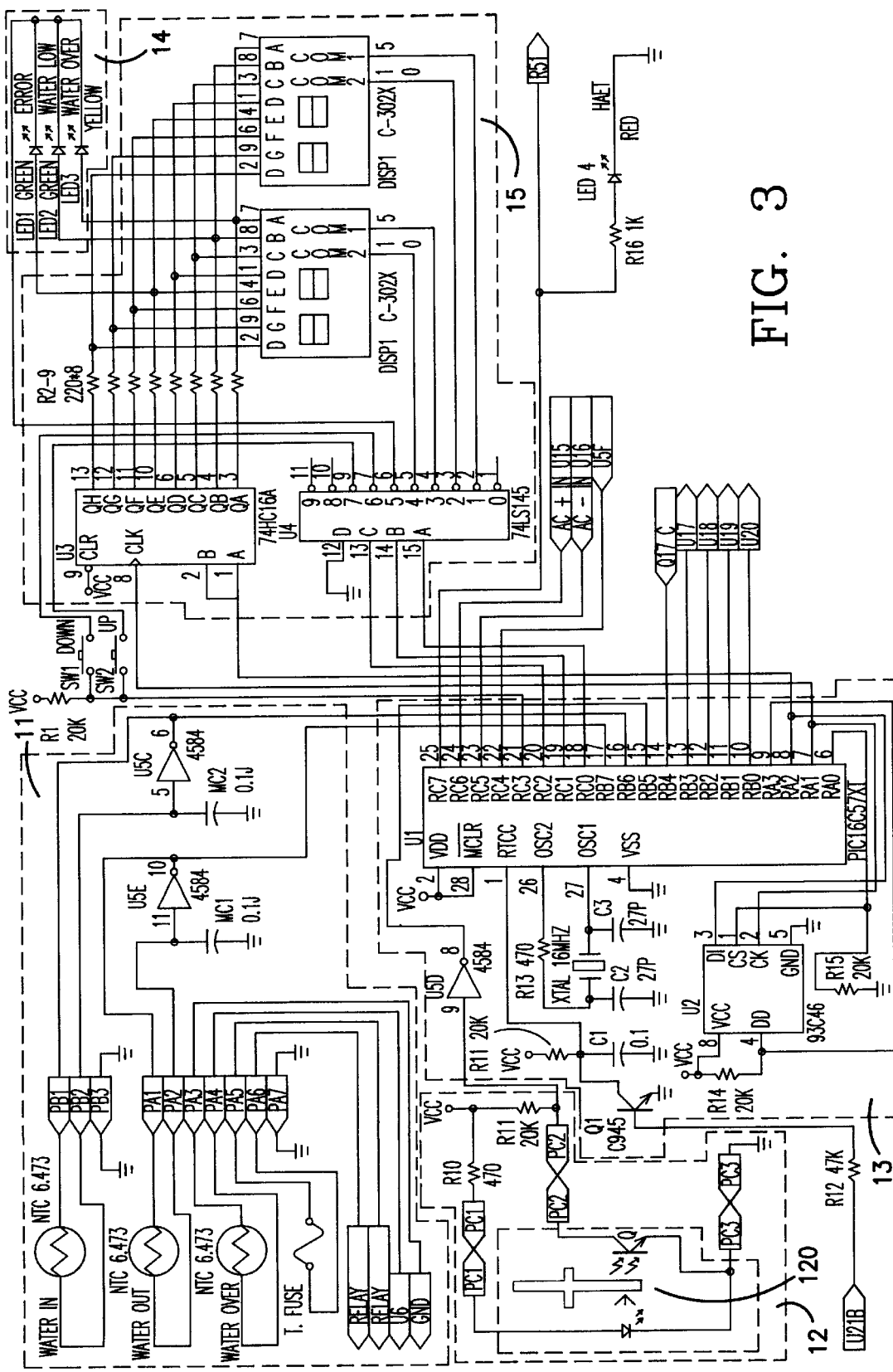
FIG. 3 is a detailed circuit diagram of a water temperature control circuit according to the present invention.

Referring to FIGS. 2, 3 and 4, a control device for an electric water heater in accordance with the present invention is generally comprised of a water temperature control circuit 10 and a power control circuit 20.

The water temperature control circuit 10 comprises a water temperature detection circuit 11, a water flow rate detection circuit 12, a CPU (central processing unit) 13, an indicator circuit 14, and a digital display 15. The water temperature detection circuit 11 is comprised of two comparators U5A,U5B and two temperature sensors NTC. One comparator U5A and one temperature sensor are mounted in the water inlet to detect the temperature of intake water. The other comparator U5SB and temperature sensor are mounted in the water outlet to detect the temperature of output water. Output signals from the comparators NTC are provided to the CPU 13 for further processing. The water flow rate detection circuit 12 is comprised of a flow meter 120 and a photo coupling transistor Q, and detects the flow rate of intake water. The output signal from the water flow rate detection circuit 12 is provided to the CPU 13 for further processing. The CPU 13 receives and processes output signals from the water temperature detection circuit 11 and the water flow rate detection circuit, and provides corresponding output control signals to control the operation of the heating elements H1,H2,H3,H4 of the electric water heater, the indicator circuit 14, the digital display 15, and the power control circuit 20.

The power control circuit 20 is comprised of a power supply circuit 21, intake water induction circuit 22, a TRAIC triggering control circuit 23, a TRAIC power circuit 230, an AC phase detection input circuit 27, a relay circuit 24, a failure detection circuit 25, and an overheat protection circuit 26. The power supply circuit 21 provides the whole control device with the necessary working voltage. The intake water induction circuit 22 is comprised of resistors, capacitors and a transistor Q17, and is installed in the water inlet to detect the presence of intake water. If no water is detected in the water inlet by the intake water induction circuit 22, the intake water induction circuit 22 immediately provides an output signal to the CPU 13, causing it to cut off power supply from the heating elements H1,H2,H3,H4 of the electric water heater, so as to prevent an explosion. The TRAIC triggering control circuit 23 is comprised of four TRAICs respectively connected to the four heating elements H1,H2,H3,H4, and four photo coupling transistors connected to the TRAIC power circuit 230 and the relay circuit 24. The TRAIC triggering control circuit 23 is controlled by the AC phase detection input circuit 27 to drive the heating elements H1,H2,H3,H4, causing the heating elements H1,H2,H3,H4 to make a full wave alternative operation subject to AC phase change. Therefore, every heating element H1,H2,H3,H4 works during each operation. The TRAIC power circuit 230 provides the TRAIC triggering control circuit 23 with the base power. The AC phase detection input circuit 27 which is comprised of two photo coupling transistors U15,U16 detects the phase of AC power supply, and provides an output signal to the TRAIC triggering control circuit 23, causing the TRAIC triggering control circuit 23 to drive the heating elements H1,H2,H3,H4 alternatively. The relay circuit 24 is comprised of two relays T1,T2 respectively connected to main power. The relay circuit 24 cuts off power supply from the electric water heater when an abnormal condition occurs. The failure detection circuit 25 is comprised of four photo coupling transistors U11,U12,U13,U14 connected to the relay circuit 24, the heating elements H1,H2,H3,H4, and the TRAIC triggering control circuit 23. If the relay circuit 24 or either heating element H1,H2,H3,H4 or the TRAIC triggering control circuit 23 fails to function well, the failure detection circuit 25 immediately provides an output signal to the CPU 13, causing the CPU 13 to cut off power supply from the electric water heater. The overheat protection circuit 26 is comprised of a thermosensitive resistor TH and flip-flops DA,DB. When the overheat protection circuit 26 detects an overheat, it immediately outputs a signal to cut off power supply from the relay circuit, causing the electric water heater to be stopped.

The operation, control and effects of the present invention are outlined hereinafter in detail.

1. The heating elements H1,H2,H3,H4 work alternatively, so that the average service life of the heating elements H1,H2,H3,H4 is prolonged.

The heating elements H1,H2,H3,H4 are all started to heat water alternatively. As illustrated in FIGS. 2 and 3, each heating element H1,H2,H3,H4 is connected to a respective TRAIC. When the electric water heater is set to work at 200 W, the AC phase detection input circuit 27 detects the waveform of AC power supply, enabling the first heating element H1 to work and the other heating elements H2,H3, H4 not to work at the first wave, the second heating element H2 to work and the other heating elements H1,H3,H4 not to work at the second wave, and so on, and therefore 200 W working status is achieved. When to work at 400 W, the first and third heating elements H1,H3 are set to work and the second and fourth heating elements H2,H4 are set not to work at the first wave, the second and fourth heating elements H2,H4 are set to work and the first and third heating elements H1,H3 are set not to work at the second wave. This control subject to phase enables each heating element H1,H2,H3,H4 to work in every use of the electric water heater. Because the heating elements H1,H2,H3,H4 work evenly, the average service life of the heating elements H1,H2,H3,H4 is prolonged. During the operation of the electric water heater, the AC phase detection input circuit 27 drives the photo coupling transistors of the TRAIC triggering control circuit 23 to work or not to work properly subject to phase sequence, enabling the respective TRAICs to be electrically connected or disconnected in proper order.

2. Water flow rate detection control

As indicated above, the water flow rate detection circuit 12 of the water temperature control circuit 10 comprises a flow meter 120, which detects the flow rate of water passing through. When the flow rate of water drops below a predetermined low level, the photo coupling transistor Q provides a biased voltage signal to the CPU 13, causing the CPU 13 to turn off the relay circuit 24, and therefore the electric water heater is turned off.

3. Water temperature detection control

The water temperature detection circuit 11 detects the temperature of water at the water inlet as well as the temperature of water at the water outlet. When the temperature of water at the water inlet is low, the heating time is relatively extended. On the contrary, when the temperature of water at the water inlet is high, the heating time is relatively shortened to save power consumption. The temperature of water at the water outlet is detected by the water temperature detection circuit 11, and then displayed through the digital display 15.

4. Auto failure detection and safe control
   i) When the relay circuit fails and the electric water heater is operated, the heating elements do not provide a feedback voltage signal to the CPU, the heating elements do not work, and LED1 of the indicator circuit 14 is turned on to indicate the condition of failure of the relay circuit. When the relay circuit is short-circuited and the electric water heater is not operated, the heating elements provide a feedback voltage, the failure detection circuit 25 detects the signal and drives LED1 of the indicator circuit 14 to flash. If the trouble is not eliminated immediately, an overheat will be produced soon. When an overheat is produced, it is immediately detected by the overheat protection circuit 26, and the overheat protection circuit 26 immediately outputs a signal to electrically disconnect the TRAICs of the TRAIC triggering control circuit 23, causing the heating elements to be turned off.
   ii) When the TRAICs of the TRAIC triggering control circuit 23 fail and the electric water heater is not operated, the TRAICs will be abnormally turned on to provide a feedback signal to the CPU 13. When the CPU 13 receives such an abnormal feedback signal, it immediately turns off the relay circuit, and turns on LED2 of the indicator circuit 14 and the digital display 15, causing the digital display 15 to show a corresponding sign of failure.
   iii) When CPU fails, all the circuits of the control device unable to function well, the relay circuit 24 is off, the heating elements are off.
   iv) When an overheat is produced due to a failure of the heating elements, the impedance of the thermosensitive resistor TH of the overheat protection circuit 26 drops, and the second flip-flop UB is driven to output a signal to the relay circuit 24, causing the relay circuit 24 to be turned off, and therefore the heating elements are turned off.
   v) When the thermosensitive resistor TH of the overheat protection circuit 26 fails, the impedance of the thermosensitive resistor TH increases drastically, and the first flip-flop UA is driven to output a signal to the relay circuit 24, causing the relay circuit 24 to be turned off, and therefore the heating elements are turned off.

5. Technical arrangement of the overheat protection circuit 26

The thermosensitive resistor TH, flip-flops UA,UB and capacitors of the overheat protection circuit 26 form an oscillation circuit to produce a frequency, which is changed subject to T=1/R (resistance)C(capacitor), F(frequency)=1/T. The value of the frequency from the oscillation circuit is converted into a digital signal, and the variation of temperature is detected. Therefore, the variation of temperature is not detected directly from the change of the value of electric current at the thermosensitive resistor.

6. Water intake interruption protection design

When the supply of water to the electric water heater is interrupted, air enters the water pipe. When the supply of water begins again, air is compressed and delivered into the electric water heater, causing the electric water heater to be started (because the pressure of air is approximately equal to the pressure of water, and the electric water heater is designed to be started by water pressure). When the heating elements of the electric water heater are turned on to heat air in the water tank, the temperature can reach 1000° C. within about 10 seconds. An explosion may occur when water enters the highly heated empty water tank of the electric water heater. In order to eliminate this problem, a grounding wire is added with a low DC power source R88 47K and connected to a first copper element at the water inlet of the electric water heater, a second copper element is mounted inside the water tank of the electric water heater, a resistor R86 20K and a transistor Q17 are connected in series between the second copper element and the CPU 13. When no water enters the water tank of the electric water heater, no electric resistance exists between the first copper element and the second copper element, electric current is prohibited from passing to the second copper element and the resistor R86, therefore the transistor Q17 does no work, and the CPU 13 judges no water. When water is delivered through the water inlet into the water tank of the electric water heater, water in between the copper elements works equivalent to an electric resistance of about 5K~50K, causing electric current to pass from the first copper element to the second copper element and the resistor R86, causing the transistor Q17 to work, and therefore the CPU 13 judges the presence of water.

It is to be understood that the drawings are designed for purposes of illustration only, and are not intended as a definition of the limits and scope of the invention disclosed.

What the invention claimed is:

1. A control device comprised of a water temperature control circuit and a power control circuit, and installed in an electric water heater having a water inlet, a water outlet and a plurality of heating elements, to control the operation of the heating elements of the electric water heater, said water temperature control circuit comprising:

a water temperature detection circuit, said water temperature detection circuit comprising comparator means and temperature sensor means installed in the water inlet and water outlet of the electric water heater to detect the temperature of water at the water inlet and the temperature of water at the water outlet and to provide a corresponding output signal;

a water flow rate detection circuit installed in the electric water heater to detect the flow rate of water passing through the water inlet and to provide a corresponding output signal, said water flow rate detection circuit comprised of a flow meter and a photo coupling transistor;

a CPU (central processing unit), which receives and processes output signals from said water temperature detection circuit and said water flow rate detection circuit, and controls the operation of the heating elements of the electric water heater subject to the nature of the signals received from said water temperature detection circuit and said water flow rate detection circuit;

an indicator circuit having a plurality of LED (light emitting diode) indicators controlled by said CPU to indicate working conditions of the electric water heater; and a digital display controlled by said CPU to show the value of water temperature at the water outlet said power control circuit comprising:

a power supply circuit, which provides the control device with the necessary working voltage;

a TRAIC triggering control circuit, said TRAIC triggering control circuit comprised of a plurality of TRAICs respectively connected to the heating elements of the electric water heater, and a plurality of photo coupling transistors respectively connected to a TRAIC power circuit and a relay circuit, said TRAIC triggering control circuit being controlled by an AC phase detection input circuit to drive the heating elements of the electric water heater causing the heating elements to make a full wave alternative operation subject to AC phase change;

a TRAIC power circuit, which provides said TRAIC triggering control circuit with the base power;

an AC phase detection input circuit, which detects the phase of AC power supply and provides an output signal to said TRAIC triggering control circuit, causing said TRAIC triggering control circuit to turn on the heating elements of the electric water heater alternatively, said AC phase detection input circuit comprised of two photo coupling transistors;

a relay circuit having two relays respectively connected to power supply to cut off power supply from the electric water heater when an abnormal condition occurs;

a failure detection circuit having a plurality of photo coupling transistors connected to said relay circuit, the heating elements of the electric water heater and said TRAIC triggering control circuit, said failure detection circuit providing an output signal to said CPU if said relay circuit or either heating element of the electric water heater or said TRAIC triggering control circuit fails to function well, causing said CPU to cut off power supply from the electric water heater; and an overheat protection circuit for overheat protection, said overheat protection circuit outputting a signal to turn off said relay circuit when an overheat is detected, causing the heating elements of the electric water heater to be turned off.

2. The control device of claim 1 wherein said overheat protection circuit comprises an oscillation circuit formed of a thermosensitive resistor, two flip-flops, and capacitor means, said oscillation circuit outputting a frequency which is changed subject to the value of temperature detected by said thermosensitive resistor, and converted to corresponding digital signal by converter means.

3. The control device of claim 1 wherein said water temperature control circuit further comprises an intake water induction circuit installed in the water inlet of the electric water heater to detect the presence of water and to output a signal to said CPU when detects no water, causing said CPU to turn off the heating elements, said intake water induction circuit comprised of resistors, capacitors and a transistor.

* * * * *